T. F. BAILY AND F. T. COPE.
CONTINUOUS TIRE VULCANIZING MACHINE.
APPLICATION FILED MAR. 6, 1920.
1,346,158.
Patented July 13, 1920.
2 SHEETS—SHEET 2.
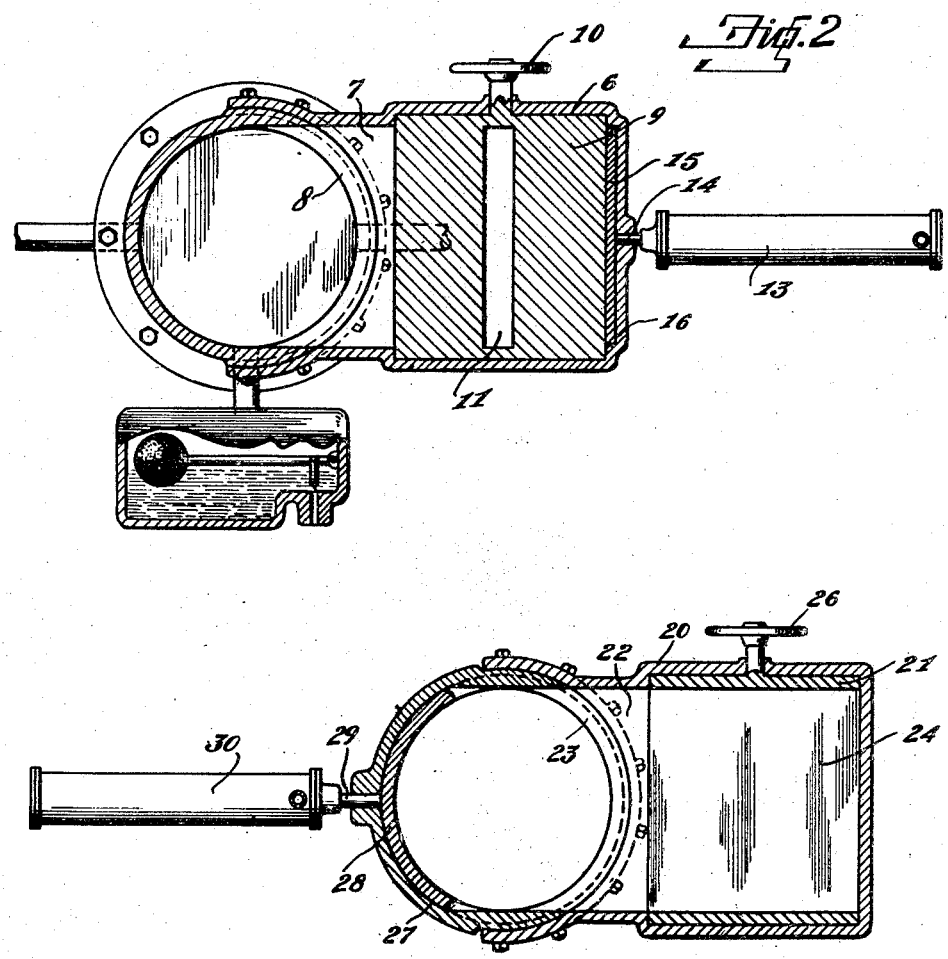
INVENTOR
T. F. Baily and F. T. Cope

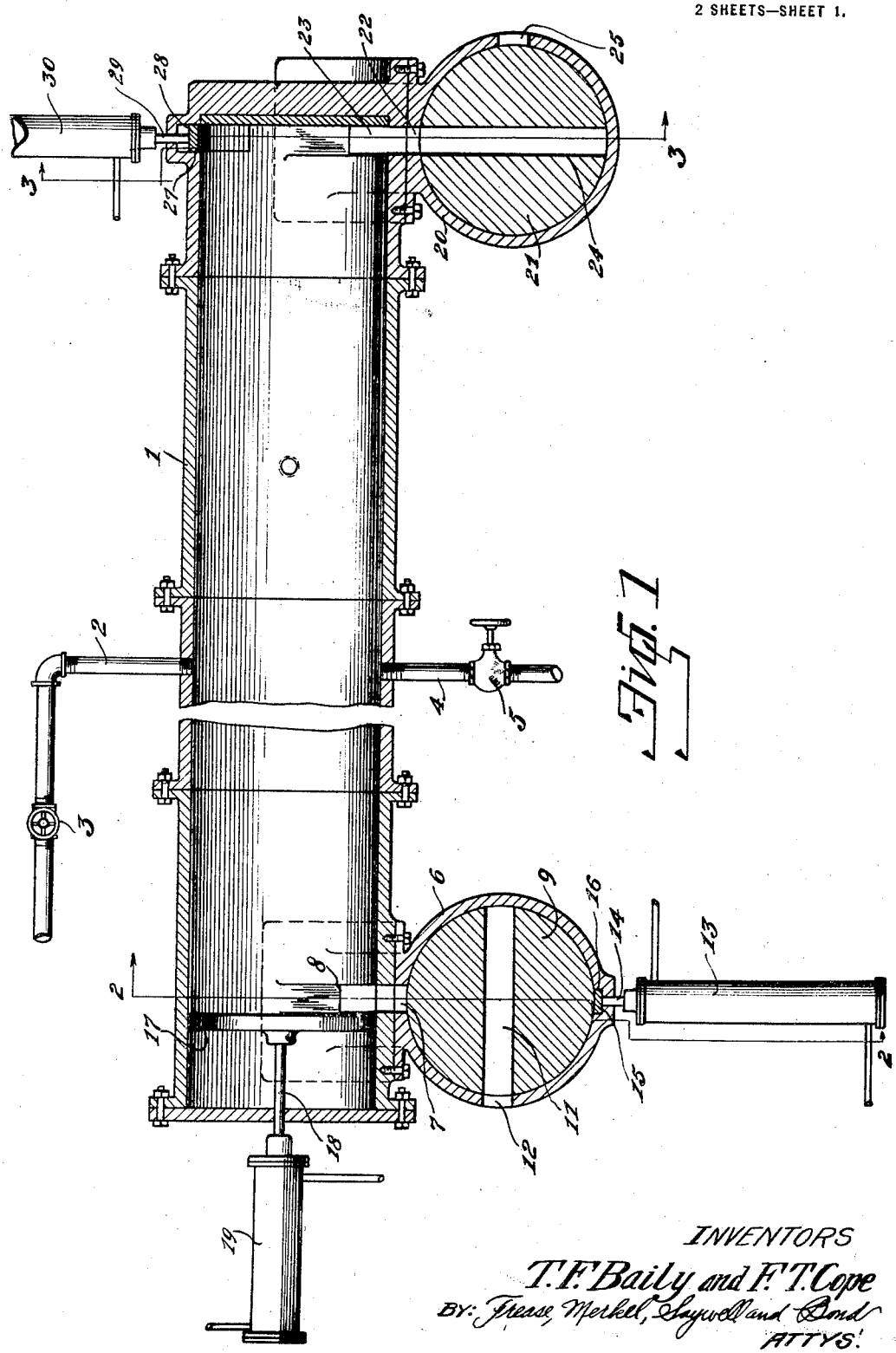

UNITED STATES PATENT OFFICE.

THADDEUS F. BAILY AND FRANK T. COPE, OF ALLIANCE, OHIO.

CONTINUOUS TIRE-VULCANIZING MACHINE.

1,346,158.     Specification of Letters Patent.     Patented July 13, 1920.

Application filed March 6, 1920. Serial No. 363,729.

*To all whom it may concern:*

Be it known that we, THADDEUS F. BAILY and FRANK T. COPE, both citizens of the United States, residing at Alliance, in the county of Stark and State of Ohio, have invented a new and useful Continuous Tire-Vulcanizing Machine, of which the following is a specification.

This invention relates to improvements in tire vulcanizing machines such as are used for vulcanizing tires in the process of the manufacture of the tires and has more especial reference to a continuous tire vulcanizing machine.

The usual practice now in common use is to take the newly built tires and place each tire separately within a mold, the molds being placed in a cylinder and tightly clamped together, thus clamping each tire within its respective mold, after which the cylinder is closed and steam at about forty pounds gage pressure which is about 287° F. is admitted to the cylinder from a period of three-fourths of an hour to two hours according to the size of the tires being vulcanized.

After the tires have remained in the cylinder for the required length of time the steam is exhausted from the cylinder and the cylinder opened and the tires in the molds are removed therefrom. This process necessitates filling the cylinder with steam and exhausting the steam therefrom with each lot of new tires which are placed therein to be vulcanized and further this process is slow and requires considerable labor in placing the tires within the cylinder and removing them therefrom.

The objects of the present invention are to provide a machine through which the tires to be vulcanized are passed continuously; to provide means obviating the necessity of exhausting the steam from the cylinder before the tires are removed therefrom; and to provide means for keeping the cylinder through which the tires are passed sealed at all times and preventing escape of steam therefrom as each tire is placed in the cylinder or removed therefrom.

With these objects in view the invention consists in the novel construction and arrangement of parts, hereinafter described, illustrated in the accompanying drawing, and particularly pointed out in the appended claims, it being understood that various changes in the form, proportions, size and minor details of construction may be made within the scope of the appended claims, without departing from the spirit or sacrificing any of the advantages of the invention. The invention thus set forth in general terms is illustrated in the accompanying drawings forming part hereof, in which—

Figure 1 is a horizontal sectional view through a machine embodying the invention.

Fig. 2 is a section on the line 2—2, Fig. 1.

Fig. 3 is a section on line 3—3, Fig. 1.

A practical embodiment of the invention is disclosed in the accompanying drawings, forming a part of this specification in which similar numerals of reference indicate corresponding parts throughout the several views.

The cylinder 1 is of suitable diameter to allow the molds containing the tires to be passed therethrough and may be of any length necessary.

Steam is admitted through the pipe 2 which communicates with a steam boiler, a valve 3 controlling the admission of steam to the cylinder. It will be understood that to obtain the desired results the steam admitted to the cylinder should be of forty pounds gage pressure which would produce a temperature of about 287° F. For the purpose of exhausting steam from the cylinder if for any reason this should be necessary an exhaust pipe 4 is provided being controlled by the valve 5.

Any suitable construction of valve may be provided for admitting the tires to the cylinder and ejecting the vulcanized tires therefrom, the valves being necessarily of such construction that little or no steam will escape from the cylinder during the operation of admitting a new tire to the cylinder or ejecting a vulcanized tire therefrom.

For the purpose of illustration a plug valve is shown at the entrance and exit ends of the cylinder. The valve at the entrance end of the cylinder comprises a casing 6 connected to the side of the cylinder near the entrance end thereof and provided with a slot 7 registering with the slot 8 in the cylinder, this slot being of sufficient size to allow the admission of a mold carrying a tire to be vulcanized.

The rotatable plug 9 mounted within the casing 6 may be rotated in any suitable and well known manner, a hand wheel 10 being shown for purpose of illustration. This plug is provided with a vertical chamber 11 of suitable size to receive a tire within its mold and arranged to register alternately with the slot 7 in the casing and the slot 12 therein.

Any suitable means for operating a plunger through the chamber 11 may be provided, a fluid cylinder 13 being shown in the present case having a piston 14 upon the end of which is provided a plunger 15 arranged to be normally seated within the slot 16 in the casing 6. This piston 14 is located at right angles to the cylinder 1 and arranged to be operated as will be hereinafter described.

A plunger 17 of slightly less diameter than the interior diameter of the cylinder is arranged to be normally located adjacent to the slot 8 in the cylinder and is mounted upon the piston 18 of the fluid cylinder 19.

At the outlet end of the cylinder a valve casing 20 is provided at one side of the cylinder, a rotary plug 21 being provided within said casing. The casing has a slot 22 therein registering with the slot 23 in the cylinder and the plug 21 is provided with a vertical chamber 24 arranged to register alternately with the slots 22 and 25 in the casing, a hand wheel 26 being provided for rotating the plug.

Diametrically opposite from the slot 23 a socket 27 is provided in the cylinder within which is normally seated the plunger 28 mounted upon the piston 29 of the fluid cylinder 30.

The operation of the device is as follows: The valve 5 is normally closed and the valve 3 open admitting steam at the proper temperature to the cylinder 1. The tires are placed within the molds such as are commonly used for vulcanizing purposes. Each tire within its mold is placed within the chamber 11 of the plug 9 after which the plug is given a quarter turn, the chamber therein registering with the slot 7 and with the socket 16. The cylinder 13 is then operated, the plunger 15 passing through the chamber 11 and pushing the mold carrying the tire through the slot 8 and into the cylinder.

The cylinder 19 is then operated, the plunger 17 moving the mold carrying the tire through the cylinder toward the outlet end thereof.

This operation is repeated until the cylinder is filled with tires properly incased within the molds.

The plug 21 being in the position shown in Fig. 1 the fluid cylinder 30 is then operated, the plunger 28 forcing the endmost tire through the slot and into the chamber 24 after which the plug 21 is given a quarter turn, the chamber 24 registering with the slot 25, and the mold containing the tire is removed from the chamber 24.

The operation of the device is thus continuous, the plunger 17 being operated after each vulcanized tire is removed at the exit end of the cylinder making room for a new tire at the entrance end thereof and the steam is kept continuously within the cylinder it not being necessary to release the steam in order to remove tires from the cylinder.

We claim.

1. A machine for vulcanizing tires comprising a cylinder, means for maintaining steam at a desired temperature within the cylinder and means for placing tires within the cylinder for vulcanizing and removing vulcanized tires therefrom without exhausting steam from the cylinder.

2. A machine for vulcanizing tires, comprising a cylinder, means for admitting steam to the cylinder, means for admitting tires at one end of the cylinder, means for moving the tires longitudinally through the cylinder and means for removing the tires from the other end of the cylinder.

3. A continuous tire vulcanizing machine comprising a cylinder, means for admitting steam to the cylinder, a valve located at one end of the cylinder and arranged to admit tires singly to the cylinder, means for moving the tires toward the other end of the cylinder and a valve at the other end of the cylinder arranged to remove the tires singly from the cylinder, said valves arranged to prevent steam from escaping from the cylinder at all times.

4. A continuous tire vulcanizing machine comprising a cylinder, means for admitting steam to the cylinder, an inlet valve for admitting tires to the cylinder, a plunger arranged to push the tires from the inlet valve into the cylinder, means for moving the tires toward the other end of the cylinder, an outlet valve at the other end of the cylinder for removing the tires from the cylinder and plunger arranged to push the tires into said outlet valve.

5. A continuous tire vulcanizing machine, comprising a cylinder, means for admitting steam to the cylinder, a plug valve near one end of the cylinder, the plug in said valve provided with a chamber arranged to receive a tire, a plunger arranged to push the tire from the chamber into the cylinder, means for moving the tires toward the other end of the cylinder, a plug valve at the other end of the cylinder, the plug in said last named valve provided with a chamber arranged to receive a tire and a plunger arranged to push a finished tire from the cylinder into said chamber.

6. A machine for vulcanizing rubber articles, comprising a chamber, means for maintaining steam at a desired temperature within the chamber and means for admitting articles to be vulcanized and removing vulcanized articles from the chamber without exhausting steam from the chamber.

In testimony that we claim the above, we have hereunto subscribed our names.

THADDEUS F. BAILY.
FRANK T. COPE.